United States Patent
Takahashi

(10) Patent No.: US 10,696,812 B2
(45) Date of Patent: Jun. 30, 2020

(54) POROUS POLY(VINYL ACETAL) OBJECT AND NONWOVEN POLY(VINYL ACETAL) FABRIC

(71) Applicant: SEKISUI CHEMICAL CO., LTD., Osaka (JP)

(72) Inventor: Katsunori Takahashi, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 113 days.

(21) Appl. No.: 16/095,820

(22) PCT Filed: Jul. 19, 2017

(86) PCT No.: PCT/JP2017/026137
§ 371 (c)(1),
(2) Date: Oct. 23, 2018

(87) PCT Pub. No.: WO2018/016536
PCT Pub. Date: Jan. 25, 2018

(65) Prior Publication Data
US 2019/0127544 A1    May 2, 2019

(30) Foreign Application Priority Data
Jul. 20, 2016  (JP) ................. 2016-142432

(51) Int. Cl.
| C08J 9/10 | (2006.01) |
| D04H 1/4326 | (2012.01) |
| C08J 9/06 | (2006.01) |
| C08J 9/00 | (2006.01) |
| C08K 3/04 | (2006.01) |
| C08K 5/11 | (2006.01) |

(52) U.S. Cl.
CPC ............ *C08J 9/103* (2013.01); *C08J 9/0023* (2013.01); *C08J 9/06* (2013.01); *C08K 3/04* (2013.01); *C08K 5/11* (2013.01); *D04H 1/4326* (2013.01); *C08J 2201/03* (2013.01); *C08J 2205/04* (2013.01); *C08J 2207/00* (2013.01); *C08J 2331/04* (2013.01)

(58) Field of Classification Search
None
See application file for complete search history.

(56) References Cited

U.S. PATENT DOCUMENTS

| 2005/0249912 A1* | 11/2005 | Randall ................. B29C 44/022 428/95 |
| 2008/0064775 A1 | 3/2008 | Wheeler et al. |
| 2009/0068914 A1* | 3/2009 | Harada ..................... B32B 5/26 442/400 |
| 2010/0086788 A1* | 4/2010 | Tsuji ................. B32B 17/10577 428/437 |
| 2016/0129674 A1 | 5/2016 | Kitano et al. |
| 2017/0298547 A1 | 10/2017 | Sasaki et al. |

FOREIGN PATENT DOCUMENTS

| JP | 45-37858 | 12/1970 |
| JP | 62-59640 | 3/1987 |
| JP | 4-279306 | 10/1992 |
| JP | 2007-536440 | 12/2007 |
| JP | 2009-513840 | 4/2009 |
| WO | 2005/116325 | 12/2005 |
| WO | 2006/101175 | 9/2006 |
| WO | 2007/050131 | 5/2007 |
| WO | 2015/016366 | 2/2015 |
| WO | 2016/047752 | 3/2016 |

OTHER PUBLICATIONS

Extended European Search Report dated Jan. 2, 2020 in corresponding European Patent Application No. 17831052.0.
International Search Report dated Sep. 26, 2017 in International (PCT) Application No. PCT/JP2017/026137.

* cited by examiner

*Primary Examiner* — Christopher M Rodd
(74) *Attorney, Agent, or Firm* — Wenderoth, Lind & Ponack, L.L.P.

(57) ABSTRACT

The present invention aims to provide a porous polyvinyl acetal object and a nonwoven polyvinyl acetal fabric each capable of exhibiting significantly high shock absorption. Provided is a porous polyvinyl acetal object having a large number of cells, including: a polyvinyl acetal; and a plasticizer, the porous object having an open cell ratio of 10% or higher, the porous object in the form of a sample with a size of 10 cm in length, 10 cm in width, and 4 mm in thickness having a coefficient of rebound (rebounding height/drop height) of 0.1 or lower in measurement of a rebounding height of a ½-inch SUS ball in conformity with JIS B 1501 dropped from a given drop height to the center of the sample placed on an iron plate with a size of 10 cm or more in length, 10 cm or more in width, and 1 cm in thickness.

13 Claims, No Drawings

POROUS POLY(VINYL ACETAL) OBJECT AND NONWOVEN POLY(VINYL ACETAL) FABRIC

TECHNICAL FIELD

The present invention relates to a porous polyvinyl acetal object and a nonwoven polyvinyl acetal fabric each capable of exhibiting significantly high shock absorption.

BACKGROUND ART

Laminated glass including two glass plates integrated through an interlayer film for a laminated glass containing a plasticized polyvinyl acetal is widely used as glass for vehicles including cars and aircraft and window glass of buildings or the like. Laminated glass can prevent scattering of glass pieces or infliction of damage by glass pieces to human bodies or instruments upon collision of an object with the glass.

Upon lamination of an interlayer film for a laminated glass and a glass plate in production of a laminated glass, an excess of the interlayer film for a laminated glass at an end portion is cut off, and a large amount of such an excess interlayer film for a laminated glass is discarded.

Laminated glass used for automobiles or aircraft needs to meet a very strict standard for quality, and those containing cells entrapped upon lamination are considered as defective products. In particular, in the case of large-area windshields, such entrapment of cells is likely to occur, and therefore, a huge amount of defective products presumably occurs in consideration of the amount of the laminated glass used in the world.

Moreover, upon scrapping the used laminated glass, a large amount of interlayer films for a laminated glass is collected and discarded.

Such a large quantity of waste interlayer films for a laminated glass is demanded to be reused from the standpoint of recycling or the like.

To meet this demand, reuse of interlayer films for a laminated glass, i.e., reuse of a plasticized polyvinyl acetal is also attempted. For example, Patent Literature 1 discloses a method of producing a foamed article by heating a mixture of polyvinyl butyral and a specific heat-decomposable foaming agent to decompose the heat-decomposable foaming agent. However, such a foamed article of a plasticized polyvinyl acetal is not particularly excellent in shock absorption and applications thereof are limited.

Accordingly, establishment of an effective recycle system of interlayer films for a laminated glass is an urgent need.

CITATION LIST

Patent Literature

Patent Literature 1: JP S62-59640 A

SUMMARY OF INVENTION

Technical Problem

The present invention aims to provide, in consideration of the state of the art, a porous polyvinyl acetal object and a nonwoven polyvinyl acetal fabric each capable of exhibiting significantly high shock absorption.

Solution to Problem

The present invention relates to a porous polyvinyl acetal object having a large number of cells, including: a polyvinyl acetal; and a plasticizer, the porous object having an open cell ratio of 10% or higher, the porous object in the form of a sample with a size of 10 cm in length, 10 cm in width, and 4 mm in thickness having a coefficient of rebound (rebounding height/drop height) of 0.1 or lower in measurement of a rebounding height of a ½-inch SUS ball in conformity with JIS B 1501 dropped from a given drop height to the center of the sample placed on an iron plate with a size of 10 cm or more in length, 10 cm or more in width, and 1 cm in thickness.

The present invention is specifically described in the following.

As a result of intensive studies, the present inventors found out that when a porous polyvinyl acetal object having a large number of cells and containing a polyvinyl acetal and a plasticizer has an open cell ratio of 10% or higher, the porous polyvinyl acetal object can exhibit significantly high shock absorption. Thus, the present invention was completed.

The porous polyvinyl acetal object (hereafter, also simply referred to as a "porous object") of the present invention contains a polyvinyl acetal and a plasticizer.

The polyvinyl acetal and the plasticizer each may be any of those used for interlayer films for a laminated glass. Accordingly, the porous polyvinyl acetal object of the present invention is significantly suitable as a target product in recycling of interlayer films for a laminated glass.

The polyvinyl acetal may be any polyvinyl acetal obtained by acetalization of polyvinyl alcohol with an aldehyde, and is preferably polyvinyl butyral. If needed, two or more polyvinyl acetals may be used in combination.

The lower limit of the degree of acetalization of the polyvinyl acetal is preferably 40 mol % and the upper limit thereof is preferably 85 mol %. The lower limit is more preferably 60 mol % and the upper limit thereof is more preferably 75 mol %.

The lower limit of the hydroxy group content of the polyvinyl acetal is preferably 15 mol % and the upper limit thereof is preferably 35 mol %. When the hydroxy group content is 15 mol % or higher, adhesiveness between the interlayer film for a laminated glass and glass is enhanced. When the hydroxy group content is 35 mol % or lower, handleability of the interlayer film for a laminated glass is enhanced.

The degree of acetalization and the hydroxy group content can be measured in conformity with "Testing Methods for Polyvinyl Butyral", JIS K6728.

The polyvinyl acetal can be prepared by acetalization of polyvinyl alcohol with an aldehyde.

The polyvinyl alcohol is commonly prepared by saponification of polyvinyl acetate, and polyvinyl alcohol with a degree of saponification of 70 to 99.8 mol % is normally used. The degree of saponification of the polyvinyl alcohol is preferably 80 to 99.8 mol %.

The lower limit of the degree of polymerization of the polyvinyl alcohol is preferably 500 and the upper limit thereof is preferably 4,000. When the degree of polymerization of the polyvinyl alcohol is 500 or higher, the resulting laminated glass has higher penetration resistance. When the degree of polymerization of the polyvinyl alcohol is 4,000 or lower, formation of an interlayer film for a laminated glass is facilitated. The lower limit of the degree of polymerization of the polyvinyl alcohol is more preferably 1,000 and the upper limit thereof is more preferably 3,600.

The aldehyde is not particularly limited, and a C1-C10 aldehyde is commonly suitably used. The C1-C10 aldehyde is not particularly limited, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The plasticizer is not particularly limited, and examples thereof include organic ester plasticizers such as monobasic organic acid esters and polybasic organic acid esters and phosphoric acid plasticizers such as organophosphate plasticizers and organophosphite plasticizers. The plasticizer is preferably a liquid plasticizer.

The monobasic organic acid esters are not particularly limited, and examples thereof include glycol esters obtained by reaction between a glycol (e.g., triethylene glycol, tetraethylene glycol, and tripropylene glycol) and a monobasic organic acid (e.g., butyric acid, isobutyric acid, caproic acid, 2-ethylbutyric acid, hepthylic acid, n-octylic acid, 2-ethylhexylic acid, pelargonic acid (n-nonylic acid), and decylic acid). In particular, preferred are triethylene glycol dicaproic acid ester, triethylene glycol di-2-ethylbutyric acid ester, triethylene glycol di-n-octylic acid ester, and triethylene glycol di-2-ethylhexylic acid ester.

The polybasic organic acid esters are not particularly limited, and examples thereof include ester compounds of a polybasic organic acid (e.g., adipic acid, sebacic acid, and azelaic acid) with a C4-C8 linear or branched alcohol. In particular, preferred are dibutyl sebacic acid ester, dioctyl azelaic acid ester, and dibutyl carbitol adipic acid ester.

The organic ester plasticizers are not particularly limited, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptylnonyl adipate, dibutyl sebacate, oil-modified sebacic alkyds, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

The organophosphate plasticizers are not particularly limited, and examples thereof include tributoxyethyl phosphate, isodecylphenyl phosphate, and triisopropyl phosphate.

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate.

The amount of the plasticizer in the porous object of the present invention is not particularly limited. The lower limit of the amount of the plasticizer is preferably 5 parts by weight and the upper limit thereof is preferably 60 parts by weight, relative to 100 parts by weight of the polyvinyl acetal. With the amount of the plasticizer within this range, high shock absorption can be exhibited and bleeding of the plasticizer from the porous object can be prevented. The lower limit of the amount of the plasticizer is more preferably 20 parts by weight and the upper limit thereof is more preferably 55 parts by weight.

In many cases, the amount of the plasticizer in the interlayer film for a laminated glass is about 20 to 55 parts by weight relative to 100 parts by weight of the polyvinyl acetal, and therefore, the waste interlayer films for a laminated glass can be used as the raw material of the porous object of the present invention without any treatment.

The porous object of the present invention may contain, in addition to the polyvinyl acetal and the plasticizer, additives commonly contained in interlayer films for a laminated glass, such as an adhesion modifier, a heat-ray absorbing agent, a UV blocking agent, an antioxidant, a light stabilizer, or an antistatic agent. For adjustment of the appearance, the porous object may contain a pigment such as carbon black or a dye.

The porous object of the present invention has an open cell ratio of 10% or higher. With such an open cell ratio, the porous object can exhibit high shock absorption. The open cell ratio is preferably 14% or higher, more preferably 30% or higher, still more preferably 50% or higher. The upper limit of the open cell ratio is not particularly limited, and is practically around 98%.

The open cell as used herein refers to cells connected to each other in the porous object.

The open cell ratio is defined as the volumetric ratio of cells connected to the outside of the porous object relative to the apparent volume of the porous object determined by size measurement, and can be determined by pycnometry described in JIS K7138 or the like.

The lower limit of the average cell size of the porous object of the present invention is preferably 100 µm and the upper limit thereof is preferably 1,000 µm. With the average cell size within this range, higher shock absorption can be exhibited. The lower limit of the average cell size is more preferably 120 µm and the upper limit thereof is more preferably 500 µm. The lower limit is still more preferably 200 µm.

The average cell size can be determined by observing cell walls and void spaces in a cross-sectional photograph of cells and measuring the sizes of the void spaces.

The porous object of the present invention preferably has an average aspect ratio of cells of 2 or less. When the average aspect ratio of cells is 2 or less, higher shock absorption can be exhibited. The average aspect ratio of cells is more preferably 1.5 or less.

The average aspect ratio of cells can be determined by measuring the major axis and minor axis of each void space in a cross-sectional photograph of cells and calculating the ratio of the axes.

The porous object of the present invention preferably has a specific gravity of 0.3 or less. When the specific gravity is 0.3 or less, higher shock absorption properties can be exhibited. The specific gravity is more preferably 0.2 or less. The lower limit of the specific gravity is not particularly limited, and is practically about 0.05. The specific gravity of the porous object of the present invention does not refer to the density of the porous object relative to the density of water but refers to, in the case of a foamed article, a ratio of the density after foaming to the density before foaming, i.e., "density after foaming/density before foaming". Specifically, based on the measured weight and the apparent volume obtained by the size measurement, the density after foaming (="measured weight after foaming/apparent volume after foaming") and the density before foaming (="measured weight before foaming/apparent volume before foaming") are calculated, and the specific gravity (="density after foaming/density before foaming") can be obtained. In the case where the measured weight and apparent volume before foaming are not known, the specific gravity can be calculated using the equation: specific gravity=1/expansion ratio.

The porous object of the present invention preferably has an apparent density of 300 kg/m$^3$ or less. When the apparent density is 300 kg/m$^3$ or less, higher shock absorption can be exhibited. The apparent density is more preferably 260 kg/m$^3$ or less, still more preferably 200 kg/m$^3$ or less.

The porous object of the present invention preferably has an apparent density of 50 kg/m$^3$ or more. When the apparent density is 50 kg/m$^3$ or more, the resulting porous object has favorable shaping properties. The apparent density is more preferably 60 kg/m$^3$ or more, still more preferably 80 kg/m$^3$ or more, particularly preferably 100 kg/m$^3$ or more.

The porous object of the present invention in the form of a porous object sample with a specific size and a specific thickness has a coefficient of rebound (rebounding height/drop height) of 0.1 or lower in measurement of a rebounding height of a ½-inch SUS ball in conformity with JIS B 1501 dropped from a given drop height to the center of the porous object sample placed on an iron plate with a specific size and a specific thickness. Having an open cell ratio of 10% or higher, the porous polyvinyl acetal object containing a polyvinyl acetal and a plasticizer can exhibit such excellent shock absorption. The coefficient of rebound (rebounding height/drop height) is preferably 0.09 or less, more preferably 0.08 or less, still more preferably 0.07 or less, particularly preferably 0.06 or less, most preferably 0.05 or less, extremely preferably 0.04 or less.

The coefficient of rebound is measured under a condition of 23° C. temperature and 50% Rh humidity.

The porous object sample has a size of 10 cm in length, 10 cm in width, and 4 mm in thickness. The iron plate has a size of 10 cm or longer in length, 10 cm or longer in width, and 1 cm in thickness.

In the case where the porous object subjected to the measurement has a thickness of less than 4 mm, a porous sample may be prepared by stacking multiple porous objects in the thickness direction to a thickness of more than 4 mm and then shaving the stack to a thickness of 4 mm. In the case where the porous object subjected to the measurement has a thickness of more than 4 mm, the porous object may be shaved to a thickness of 4 mm to provide a porous sample. When accurate shaving to a thickness of 4 mm is difficult, an average thickness of 4 mm±0.1 mm is acceptable.

The thickness of the porous object sample can be adjusted using a slicer such as a band machine-slicer (e.g., Model: "Band machine NP-120RS" available from Nippy Kikai Co., Ltd).

The upper limit of the thickness of the porous object of the present invention is preferably 100 mm. When the porous object of the present invention has a thickness of 100 mm or less, deformation of the porous object due to its own weight can be suppressed. The lower limit of the thickness of the porous object of the present invention is preferably 50 μm. When the porous object of the present invention has a thickness of 50 μm or more, shock absorption of the porous object is further enhanced.

The porous object of the present invention may be produced by any method. It is preferably produced by a method of blending the polyvinyl acetal, the plasticizer, and additives according to needs with a heat-decomposable foaming agent to prepare a resin composition and then heating the resin composition to a foaming temperature to decompose the heat-decomposable foaming agent. Specifically, the porous object of the present invention is preferably a foamed article.

For production of the porous object having an open cell ratio of 10% or higher, it is significantly important to appropriately set the type and amount of the heat-decomposable foaming agent and the foaming temperature. In particular, setting of the foaming temperature is essential to achieve the high open cell ratio.

The foaming temperature is preferably 180° C. or higher. When the foaming temperature is 180° C. or higher, the resin composition upon foaming is sufficiently softened to facilitate communication between cells, presumably facilitating generation of open cells. An increase in the open cell ratio along with an increase in the foaming temperature seems to be a phenomenon peculiar to a resin composition containing a polyvinyl acetal and a plasticizer because such phenomenon is not observed in the case of a resin composition containing a resin other than polyvinyl acetal. For higher open cell ratio, the foaming temperature is more preferably 190° C. or higher, still more preferably 230° C. or higher.

The heat-decomposable foaming agent may be any conventionally known foaming agent having a decomposition temperature of about 120° C. to 240° C. For higher open cell ratio, in the case where the foaming temperature is set to 180° C. or higher, the heat-decomposable foaming agent is preferably selected so that the foaming temperature is higher than the decomposition temperature of the heat-decomposable foaming agent. More specifically, the heat-decomposable foaming agent is selected so that the foaming temperature is higher than the decomposition temperature of the heat-decomposable foaming agent by preferably 20° C. or more, more preferably by 50° C. or more, still more preferably by 80° C. or more.

Specific examples of the heat-decomposable foaming agent include azodicarbonamide, N,N'-dinitrosopentamethylenetetramine, 4,4'-oxybis(benzenesulfonylhydrazide), urea, sodium hydrogen carbonate, and mixtures of these.

Examples of commercial products of the heat-decomposable foaming agent include CELLMIC series (available from Sankyo Kasei Co., Ltd.) and VINYFOR series, CELLULAR series, and NEOCELLBORN series (available from Eiwa Chemical Inc. Co., Ltd.).

The amount of the heat-decomposable foaming agent in the resin composition is not particularly limited. The lower limit of the amount of the heat-decomposable foaming agent is preferably 4 parts by weight and the upper limit thereof is preferably 20 parts by weight, relative to 100 parts by weight of the polyvinyl acetal. With the amount of the heat-decomposable foaming agent within this range, the porous object having an open cell ratio of 10% or higher can be produced. The lower limit of the amount of the heat-decomposable foaming agent is more preferably 5 parts by weight and the upper limit thereof is more preferably 15 parts by weight.

High shock absorption indicated by the coefficient of rebound (rebounding height/drop height) of 0.1 or lower can be also achieved by a nonwoven polyvinyl acetal fabric formed of a fiber containing a polyvinyl acetal and a plasticizer. In terms of higher shock absorption, a porous object is superior to a nonwoven fabric.

The present invention also encompasses a nonwoven polyvinyl acetal fabric including a fiber containing a polyvinyl acetal and a plasticizer, the nonwoven fabric having a weight per unit area of 100 to 800 g/m$^2$, the nonwoven fabric in the form of a sample with a size of 10 cm in length, 10 cm in width, and 4 mm in thickness having a coefficient of rebound (rebounding height/drop height) of 0.1 or lower in measurement of a rebounding height of a ½-inch SUS ball in conformity with JIS B 1501 dropped from a given drop height to the center of the sample placed on an iron plate with a size of 10 cm or more in length, 10 cm or more in width, and 1 cm in thickness.

The polyvinyl acetal, plasticizer, and additives used for the nonwoven polyvinyl acetal fabric (hereafter, also simply referred to as a "nonwoven fabric") of the present invention may be the same as the polyvinyl acetal, plasticizer, and additives used for the porous object of the present invention.

A nonwoven fabric sample for measurement of the coefficient of rebound can be prepared by the same method as that for the porous object sample in the case of the porous object of the present invention described above.

The lower limit of the weight per unit area of the nonwoven fabric of the present invention is 100 g/m$^2$ and the upper limit thereof is 800 g/m$^2$. With the weight per unit area of the nonwoven fabric within this range, high shock absorption can be achieved. The lower limit of the weight per unit area of the nonwoven fabric is preferably 150 g/m$^2$ and the upper limit thereof is preferably 660 g/m$^2$. The lower limit is more preferably 200 g/m$^2$ and the upper limit is more preferably 500 g/m$^2$.

The lower limit of the average diameter of fibers (average fiber diameter) constituting the nonwoven fabric of the present invention is preferably 50 μm and the upper limit thereof is preferably 2 mm. With the average diameter of fibers (average fiber diameter) within this range, higher shock absorption can be exhibited. The lower limit of the average diameter of fibers (average fiber diameter) is more preferably 100 μm and the upper limit thereof is more preferably 1 mm.

The average diameter of fibers (average fiber diameter) constituting the nonwoven fabric of the present invention is preferably ½ or less, more preferably ⅓ or less, still more preferably ¼ or less, relative to the thickness of the nonwoven fabric of the present invention. The average diameter of fibers (average fiber diameter) constituting the nonwoven fabric of the present invention is preferably 1/100 or more, more preferably 1/50 or more, still more preferably 1/10 or more, relative to the thickness of the nonwoven fabric of the present invention. When the ratio of the average diameter of fibers constituting the nonwoven fabric to the thickness of the nonwoven fabric of the present invention is not higher than the above preferable value, higher shock absorption can be exhibited.

The nonwoven fabric of the present invention can be produced, for example, by extruding a resin composition containing a polyvinyl acetal, a plasticizer, additives, and the like in the form of strands from an extruder, cutting the strands to an appropriate length, stacking the cut strands, and thermally pressure bonding the resulting stack using a press machine. In this process, adjustment of the diameter or length of the strands and the conditions for thermal pressure bonding enables adjustment of the weight per unit area of the resulting nonwoven fabric.

The upper limit of the thickness of the nonwoven fabric of the present invention is preferably 100 mm. When the nonwoven fabric of the present invention has a thickness of 100 mm or less, deformation of the nonwoven fabric due to its own weight can be suppressed. The upper limit of the thickness of the nonwoven fabric of the present invention is more preferably 10 mm, still more preferably 4 mm. The lower limit of the thickness of the nonwoven fabric of the present invention is preferably 50 μm. When the nonwoven fabric of the present invention has a thickness of 50 μm or more, shock absorption of the nonwoven fabric is further enhanced. The lower limit of the thickness of the nonwoven fabric of the present invention is more preferably 100 μm, still more preferably 500 μm, particularly preferably 1 mm.

The porous polyvinyl acetal object and nonwoven polyvinyl acetal fabric of the present invention each exhibit significantly high shock absorption. Therefore, the porous polyvinyl acetal object and nonwoven polyvinyl acetal fabric of the present invention each are remarkably suitable as a shock absorption material, a sound insulation material, or a vibration absorption material (including a damping material and an aseismic material) when used alone or in combination with another member.

The present invention also encompasses a sound insulation material including the porous polyvinyl acetal object of the present invention.

The present invention also encompasses a shock absorption material including the porous polyvinyl acetal object of the present invention.

The present invention also encompasses a vibration absorption material including the porous polyvinyl acetal object of the present invention.

The present invention also encompasses a sound insulation material including the nonwoven polyvinyl acetal fabric of the present invention.

The present invention also encompasses a shock absorption material including the nonwoven polyvinyl acetal fabric of the present invention.

The present invention also encompasses a vibration absorption material including the nonwoven polyvinyl acetal fabric of the present invention.

The specific application of the porous polyvinyl acetal object and nonwoven polyvinyl acetal fabric of the present invention may be any applications such as members for vehicles, members for buildings, members for interior materials, electric members, and members for other applications.

Examples of the members for vehicles include those used for reducing the vibration, shock, or noise, such as ceiling materials, interior materials, and interior lining materials of vehicles including automobiles, aircraft, and ships.

Examples of the members for buildings include those used for reducing the vibration, shock, or noise, such as floor substrates, materials for soundproof walls, ceiling materials, and lining materials for resin tile or metal tile.

Examples of the members for interior materials include those used for reducing the vibration, shock, or noise, such as carpet backing materials, curtain materials, and wallpaper.

Examples of the electric members include electronic components in mobile phones, tablet PCs, and PCs, and those used for reducing the vibration, shock, or noise in home appliances such as audio instruments, headphones, TVs, refrigerators, washing machines, and cleaners, or commercial-use electrical appliances.

Examples of the members for other applications include those used for relaxation of shock upon collision in floors, mats, or walls in indoor/outdoor athletic facilities.

The porous polyvinyl acetal object and nonwoven polyvinyl acetal fabric of the present invention can be prepared by using the waste interlayer films for a laminated glass as the raw material without any treatment, and therefore are remarkably effective for establishment of the recycle system.

Advantageous Effects of Invention

The present invention can provide a porous polyvinyl acetal object and a nonwoven polyvinyl acetal fabric each capable of exhibiting significantly high shock absorption.

DESCRIPTION OF EMBODIMENTS

Embodiments of the present invention are more specifically described in the following with reference to, but not limited to, examples.

Example 1

To 100 parts by weight of polyvinyl butyral 1 (PVB1) were added 40 parts by weight of triethylene glycol di-2-ethylhexanoate (3GO) as a plasticizer, 8.4 parts by weight of CELLMIC CAP as a heat-decomposable foaming agent, and 1.4 parts by weight of carbon black. The resulting mixture was sufficiently kneaded with a mixing roll at 110° C. and then extruded from an extruder into a sheet.

The obtained sheet was placed in an oven and the heat-decomposable foaming agent therein was decomposed at a foaming temperature of 230° C. Thus, a porous object was obtained.

Here, PVB1 had a hydroxy group content of 30 mol %, a degree of acetylation of 1 mol %, a degree of butyralization of 69 mol %, and an average degree of polymerization of 1,700. CELLMIC CAP is available from Sankyo Kasei Co., Ltd. and has a decomposition temperature of 125° C. The carbon black used is SEAST SP available from Tokai Carbon Co., Ltd.

The open cell ratio of the obtained porous object was measured by pycnometry in conformity with JIS K7138. The average cell size and the average aspect ratio of cells were measured as follows by microscopic observation of void spaces. The apparent density was obtained by calculation based on the apparent volume obtained from size measurement and the measured weight. The specific gravity was obtained by calculation based on the apparent volume obtained from size measurement and the measured weight.

(Measurement of Average Cell Size)

A porous object sample for measurement was cut to a size of 50 mm in length, 50 mm in width, and 4 mm in thickness and immersed in liquid nitrogen for one minute. Then, the sample was cut along a plane parallel to the thickness direction using a razor blade.

A magnified photograph (×200) of the cut plane was taken using a digital microscope (VHX-900 available from Keyence Corporation), and the cell size of every cell present in the cut plane within a range of 2 mm in length in the thickness direction was measured.

The same operation was repeated five times at different measurement sites, and the average of all the cell sizes measured in the observation was taken as the average cell size.

The cell size of each cell was determined as the diameter of the largest circle inscribed in the cell.

(Average Aspect Ratio of Cells)

In the measurement of the average cell size, the major axis and minor axis of an ellipse inscribed in each cell observed were measured, and the aspect ratio was obtained by dividing the length of the major axis by the length of the minor axis. The aspect ratios of all the cells observed were obtained, and the average of the obtained aspect ratios was obtained.

Example 2

A porous object was obtained as in Example 1, except that the foaming temperature was changed to 190° C.

Example 3

A porous object was obtained as in Example 1, except that the amount of the heat-decomposable foaming agent was changed to 5.6 parts by weight.

Example 4

A porous object was obtained as in Example 1, except that the heat-decomposable foaming agent used was 5.6 parts by weight of VINYFOR AC-K3 (available from Eiwa Chemical Inc. Co., Ltd., decomposition temperature of 210° C.).

Example 5

A porous object was obtained as in Example 1, except that the amount of the plasticizer was changed to 20 parts by weight.

Example 6

A porous object was obtained as in Example 1, except that the amount of the plasticizer was changed to 20 parts by weight and the heat-decomposable foaming agent used was 5.6 parts by weight of CELLMIC CAP.

Example 7

A porous object was obtained as in Example 1, except that PVB1 was changed to polyvinyl butyral (PVB2, hydroxy group content of 23 mol %, degree of acetylation of 13 mol %, degree of butyralization of 64 mol %, average degree of polymerization of 2,400), the amount of the plasticizer was changed to 60 parts by weight, and the heat-decomposable foaming agent used was AC-K3.

Example 8

As an interlayer film for a laminated glass, "S-LEC Clear Film" ("S-LEC" in tables) available from Sekisui Chemical Co., Ltd. was prepared. The interlayer film for a laminated glass was shredded to a size of 7 mm×10 mm to prepare a recycling material.

To 100 parts by weight of the obtained recycling material were added 6 parts by weight of CELLMIC CAP as a heat-decomposable foaming agent and 1 part by weight of carbon black. The mixture was sufficiently kneaded with a mixing roll at 110° C. and then extruded from an extruder into a sheet. The obtained sheet was placed in an oven and the heat-decomposable foaming agent therein was decomposed at a foaming temperature of 230° C. Thus, a porous object was obtained.

Example 9

A porous object was obtained as in Example 3, except that the foaming temperature was changed to 190° C.

Example 10

To 100 parts by weight of polyvinyl butyral (PVB1) were added 40 parts by weight of 3GO, 5.6 parts by weight of CELLMIC AN, 2.0 parts by weight of trimethylolpropane triacrylate (TMPTA), 0.4 parts by weight of benzophenone, and 1.4 parts by weight of carbon black, thereby preparing a resin composition. The obtained resin composition was sufficiently kneaded with a mixing roll at 110° C. and then extruded from an extruder into a sheet with a thickness of 1 mm. Both surfaces of the obtained sheet were irradiated with UV rays at a dose of 1,500 mJ/cm$^2$ (365 nm) using a high-pressure mercury lamp (TOSCURE 401 available from Toshiba Lighting & Technology Corporation). Thus, benzophenone was activated to perform crosslinking. To both surfaces of the obtained crosslinked sheet was heat-welded a fluororesin net (NR0515 available from Flonchemical Co., Ltd., 18 mesh equivalent, thickness of 0.7 mm) at 60° C. The resulting sheet was placed in an oven and the heat-decomposable foaming agent was decomposed at a foaming temperature of 230° C., thereby allowing the sheet to foam. After the foaming, the fluororesin nets were removed. The volume was changed due to the foaming only in the thickness direction because elongation in the planar direction was prevented by the Teflon® mesh. Thus, a porous object having rugby ball-shaped cells was obtained.

CELLMIC AN is available from Sankyo Kasei Co., Ltd. and has a decomposition temperature of 125° C. TMPTA used was available from Tokai Carbon Co., Ltd. and the carbon black used was available from Tokai Carbon Co., Ltd.

Example 11

To 100 parts by weight of polyvinyl butyral 1 (PVB1) was added 40 parts by weight of triethylene glycol di-2-ethylhexanoate (3GO) as a plasticizer, thereby preparing a resin composition. The obtained resin composition was sufficiently kneaded with a mixing roll and extruded from an extruder into strands with a diameter of 1 mm.

The obtained strands were cut to a length of 10 cm and then randomly stacked to have a weight per unit area after thermal pressure bonding of 400 g/m$^2$. The resulting stack was thermally pressure bonded using a press machine so that contact portions of the strands were thermally fused. Thus, a nonwoven fabric was obtained.

Fibers constituting the obtained nonwoven fabric had an average diameter (average fiber diameter) of 1 mm that was the same as the diameter of each strand.

The thermal pressure bonding was performed under the conditions of an interval between press plates of 4 mm, a press temperature of 130° C., and a press time of three minutes.

Example 12

A nonwoven fabric was obtained as in Example 11, except that the strands were stacked to have a weight per unit area after thermal pressure bonding of 300 g/m$^2$.

Example 13

A nonwoven fabric was obtained as in Example 11, except that the strands were stacked to have a weight per unit area after thermal pressure bonding of 800 g/m$^2$.

Comparative Example 1

A commercially available polyethylene foamed article (Softlon S available from Sekisui Chemical Co., Ltd., expansion ratio of 30 times) was used as a comparative example.

Comparative Example 2

A commercially available polyethylene foamed article (Softlon S available from Sekisui Chemical Co., Ltd., expansion ratio of 40 times) was used as a comparative example.

Comparative Example 3

A commercially available polypropylene foamed article (Softlon SP available from Sekisui Chemical Co., Ltd., expansion ratio of 15 times) was used as a comparative example.

Comparative Example 4

The polyethylene foamed article of Comparative Example 1 was subjected to perforation using a perforation roll with 150-micron-thick needles to have an open cell ratio of 50%.

Comparative Example 5

A porous object was obtained as in Example 1, except that the foaming temperature was changed to 170° C.

Comparative Example 6

A porous object was obtained as in Example 1, except that the amount of the heat-decomposable foaming agent was changed to 3.0 parts by weight.

(Evaluation)

The following evaluation was performed on the porous objects obtained in the examples and comparative examples. Tables 1 and 2 show the results.

(Ball Drop Test)

The porous objects and nonwoven fabrics obtained in the examples and comparative examples were each cut to a size of 10 cm in length, 10 cm in width, and 4 mm in thickness, thereby preparing measurement samples. Cutting in the length direction and the width direction was performed using a box cutter and adjustment of the thickness was performed using a band machine-slicer ("Band machine NP-12ORS" available from Nippy Kikai Co., Ltd.). When accurate cutting to a thickness of 4 mm is difficult, an average thickness of 4 mm±0.1 mm was acceptable.

The measurement sample was placed on an iron plate having a size of 15 cm in length, 15 cm in width, and 1 cm in thickness. A SUS ball (equivalent inch size: ½ inch) in conformity with JIS B 1501 was dropped on the sample from heights of 10 cm, 20 cm, and 30 cm, and the rebounding heights were determined. Based on the obtained values, the coefficients of rebound (rebounding height/drop height) were calculated. The measurement was performed under a condition of 23° C. temperature and 50% Rh humidity.

(Shock Absorption Test)

The measurement samples having a size of 10 cm in length, 10 cm in width, and 4 mm in thickness were obtained by the same method as in the ball drop test.

The measurement sample was placed on an iron plate having a size of 10 cm or more in length, 10 cm or more in width, and 1 cm in thickness. A closed Erlenmeyer flask with stopper (capacity: 10 mL, total height: 50 mm, maximum outer diameter: 30 mm) was vertically dropped to the sample from 20 cm or 30 cm above the sample in such a manner that the flask bottom hit the sample.

This operation was continuously repeated 10 times, and the number of times the stopper did not come off due to the drop impact was recorded in Table 1 and Table 2.

TABLE 1

|  |  |  |  | Example 1 | Example 2 | Example 3 | Example 4 | Example 5 |
|---|---|---|---|---|---|---|---|---|
| Material | Thermoplastic resin | Type | — | PVB1 | PVB1 | PVB1 | PVB1 | PVB1 |
|  |  | Amount | Parts by weight | 100 | 100 | 100 | 100 | 100 |
|  | Plasticizer | Type | — | 3GO | 3GO | 3GO | 3GO | 3GO |
|  |  | Amount | Parts by weight | 40 | 40 | 40 | 40 | 20 |
|  | Foaming agent | Type | — | CELMIC CAP | CELMIC CAP | CELMIC CAP | VINYFOR AC-K3 | CELMIC CAP |
|  |  | Amount | Parts by weight | 8.4 | 8.4 | 5.6 | 5.6 | 8.4 |
|  | Others | Type | — | Carbon black | Carbon black | Carbon black | Carbon black | Carbon black |
|  |  | Amount | Parts by weight | 1.4 | 1.4 | 1.4 | 1.4 | 1.4 |
|  |  | Type | — | — | — | — | — | — |
|  |  | Amount | Parts by weight | — | — | — | — | — |
|  |  | Type | — | — | — | — | — | — |
|  |  | Amount | Parts by weight | — | — | — | — | — |
|  | Foaming temperature |  | °C. | 230 | 230 | 230 | 230 | 230 |
| Shape | Shape |  | — | Porous object | Porous object | Porous object | Porous object | Porous object |
|  | Open cell ratio |  | % | 82 | 12 | 54 | 14 | 67 |
|  | Apparent density |  | kg/m$^3$ | 104 | 199 | 130 | 200 | 112 |
|  | Specific gravity |  | — | 0.10 | 0.20 | 0.13 | 0.20 | 0.11 |
|  | Avrage aspect ratio |  | — | 1.3 | 1.1 | 1.2 | 1.1 | 1.1 |
|  | Average cell size |  | μm | 300 | 220 | 300 | 250 | 250 |
|  | Weight per unit area |  | g/m$^2$ |  |  |  |  |  |
| Ball drop test | Drop height 10 cm | Rebounding height | cm | 0.0 | 0.1 | 0.0 | 0.1 | 0.5 |
|  |  | Coefficient of rebound | — | 0.00 | 0.01 | 0.00 | 0.01 | 0.05 |
|  | Drop height 20 cm | Rebounding height | cm | 0.2 | 0.5 | 0.3 | 0.5 | 1.2 |
|  |  | Coefficient of rebound | — | 0.01 | 0.03 | 0.02 | 0.03 | 0.06 |
|  | Drop height 30 cm | Rebounding height | cm | 0.4 | 0.8 | 0.5 | 0.7 | 1.5 |
|  |  | Coefficient of rebound | — | 0.01 | 0.03 | 0.02 | 0.02 | 0.05 |
| Evaluation | Drop test of Erlenmeyer flask with stopper (drop height of 20 cm) |  |  | 10 | 10 | 10 | 10 | 10 |
|  | Drop test of Erlenmeyer flask with stopper (drop height of 30 cm) |  |  | 10 | 9 | 9 | 10 | 7 |

|  |  |  |  | Example 6 | Example 7 | Example 8 | Example 9 | Example 10 |
|---|---|---|---|---|---|---|---|---|
| Material | Thermoplastic resin | Type | — | PVB1 | PVB2 | S-LEC | PVB1 | PVB1 |
|  |  | Amount | Parts by weight | 100 | 100 | 100 | 100 | 100 |
|  | Plasticizer | Type | — | 3GO | 3GO | — | 3GO | 3GO |
|  |  | Amount | Parts by weight | 20 | 60 | — | 40 | 40 |
|  | Foaming agent | Type | — | CELMIC CAP | VINYFOR AC-K3 | CELMIC CAP | CELMIC CAP | CELMIC AN |
|  |  | Amount | Parts by weight | 5.6 | 8.4 | 6 | 5.6 | 5.6 |
|  | Others | Type | — | Carbon black | Carbon black | Carbon black | Carbon black | Carbon black |
|  |  | Amount | Parts by weight | 1.4 | 1.4 | 1 | 1.4 | 1.4 |
|  |  | Type | — | — | — | — | — | TMPTA |
|  |  | Amount | Parts by weight | — | — | — | — | 2.0 |
|  |  | Type | — | — | — | — | — | Benzophenone |
|  |  | Amount | Parts by weight | — | — | — | — | 0.4 |
|  | Foaming temperature |  | °C. | 230 | 230 | 230 | 190 | 230 |
| Shape | Shape |  | — | Porous object | Porous object | Porous object | Porous object | Porous object |
|  | Open cell ratio |  | % | 67 | 90 | 85 | 35 | 60 |
|  | Apparent density |  | kg/m$^3$ | 251 | 94 | 113 | 295 | 153 |
|  | Specific gravity |  | — | 0.25 | 0.09 | 0.11 | 0.30 | 0.15 |
|  | Avrage aspect ratio |  | — | 1.2 | 1.2 | 1.1 | 1.1 | 1.8 |
|  | Average cell size |  | μm | 210 | 260 | 270 | 200 | 180 |
|  | Weight per unit area |  | g/m$^2$ |  |  |  |  |  |
| Ball drop test | Drop height 10 cm | Rebounding height | cm | 0.7 | 0.0 | 0.0 | 0.8 | 0.1 |
|  |  | Coefficient of rebound | — | 0.07 | 0.00 | 0.00 | 0.09 | 0.01 |
|  | Drop height 20 cm | Rebounding height | cm | 1.5 | 0.2 | 0.3 | 1.6 | 0.4 |
|  |  | Coefficient of rebound | — | 0.08 | 0.01 | 0.02 | 0.08 | 0.02 |
|  | Drop height 30 cm | Rebounding height | cm | 2.4 | 0.3 | 0.8 | 2.7 | 0.6 |
|  |  | Coefficient of rebound | — | 0.08 | 0.01 | 0.03 | 0.09 | 0.02 |
| Evaluation | Drop test of Erlenmeyer flask with stopper (drop height of 20 cm) |  |  | 10 | 10 | 10 | 9 | 10 |
|  | Drop test of Erlenmeyer flask with stopper (drop height of 30 cm) |  |  | 8 | 9 | 9 | 7 | 10 |

TABLE 2

|  |  |  |  | Example 11 | Example 12 | Example 13 | Comparative Example 1 |
|---|---|---|---|---|---|---|---|
| Material | Thermoplastic resin | Type | — | PVB1 | PVB1 | PVB1 | Polyethylene |
|  |  | Amount | Parts by weight | 100 | 100 | 100 | — |
|  | Plasticizer | Type | — | 3GO | 3GO | 3GO | — |
|  |  | Amount | Parts by weight | 40 | 40 | 40 | — |
|  | Foaming agent | Type | — | — | — | — | — |
|  |  | Amount | Parts by weight | — | — | — | — |
|  | Others | Type | — | — | — | — | — |
|  |  | Amount | Parts by weight | — | — | — | — |
|  | Foaming temperature |  | °C. | — | — | — | — |
| Shape |  | Shape | — | Nonwoven fabric | Nonwoven fabric | Nonwoven fabric | Porous object |
|  |  | Open cell ratio | % |  |  |  | <1 |
|  |  | Apparent density | kg/m³ |  |  |  | 33 |
|  |  | Specific gravity | — |  |  |  | 0.033 |
|  |  | Average aspect ratio | — |  |  |  | 1.1 |
|  |  | Average cell size | μm |  |  |  | 200 |
|  |  | Weight per unit area | g/m² | 400 | 300 | 800 |  |
| Ball drop test | Drop height 10 cm | Rebounding height | cm | 0.2 | 0.2 | 0.5 | 5.8 |
|  |  | Coefficient of rebound | — | 0.02 | 0.02 | 0.05 | 0.58 |
|  | Drop height 20 cm | Rebounding height | cm | 0.5 | 0.4. | 1.1 | 12.6 |
|  |  | Coefficient of rebound | — | 0.03 | 0.02 | 0.06 | 0.63 |
|  | Drop height 30 cm | Rebounding height | cm | 0.7 | 0.6 | 1.4 | 16.2 |
|  |  | Coefficient of rebound | — | 0.02 | 0.02 | 0.05 | 0.54 |
| Evaluation | Drop test of Erlenmeyer flask with stopper (drop height of 20 cm) |  |  | 10 | 10 | 10 | 5 |
|  | Drop test of Erlenmeyer flask with stopper (drop height of 30 cm) |  |  | 7 | 7 | 5 | 2 |

|  |  |  |  | Comparative Example 2 | Comparative Example 3 | Comparative Example 4 | Comparative Example 5 | Comparative Example 6 |
|---|---|---|---|---|---|---|---|---|
| Material | Thermoplastic resin | Type | — | Polyethylene | Polypropylene | Polyethylene | PVB1 | PVB1 |
|  |  | Amount | Parts by weight | — | — | — | 100 | 100 |
|  | Plasticizer | Type | — | — | — | — | 3GO | 3GO |
|  |  | Amount | Parts by weight | — | — | — | 40 | 40 |
|  | Foaming agent | Type | — | — | — | — | CELMIC CAP | CELMIC CAP |
|  |  | Amount | Parts by weight | — | — | — | 8.4 | 3.0 |
|  | Others | Type | — | — | — | — | Carbon black | Carbon black |
|  |  | Amount | Parts by weight | — | — | — | 1.4 | 1.4 |
|  | Foaming temperature |  | °C. | — | — | — | 170 | 230 |
| Shape |  | Shape | — | Porous object | Porous object | Porous object | Porous object | Porous object |
|  |  | Open cell ratio | % | <1 | <1 | 50 | 6 | 40 |
|  |  | Apparent density | kg/m³ | 25 | 62 | 33 | 153 | 450 |
|  |  | Specific gravity | — | 0.025 | 0.06 | 0.033 | 0.15 | 0.45 |
|  |  | Average aspect ratio | — | 1.2 | 1.1 | 1.1 | 1.1 | 1.0 |
|  |  | Average cell size | μm | 200 | 150 | 200 | 180 | 150 |
|  |  | Weight per unit area | g/m² |  |  |  |  |  |
| Ball drop test | Drop height 10 cm | Rebounding height | cm | 5.8 | 3.5 | 5.2 | 4.6 | 1.5 |
|  |  | Coefficient of rebound | — | 0.58 | 0.35 | 0.52 | 0.46 | 0.15 |
|  | Drop height 20 cm | Rebounding height | cm | 11.5 | 6 | 12 | 10 | 3.4 |
|  |  | Coefficient of rebound | — | 0.58 | 0.3 | 0.6 | 0.5 | 0.17 |
|  | Drop height 30 cm | Rebounding height | cm | 16.8 | 9.6 | 15.6 | 15.8 | 5.2 |
|  |  | Coefficient of rebound | — | 0.56 | 0.32 | 0.52 | 0.79 | 0.17 |
| Evaluation | Drop test of Erlenmeyer flask with stopper (drop height of 20 cm) |  |  | 4 | 3 | 3 | 4 | 7 |
|  | Drop test of Erlenmeyer flask with stopper (drop height of 30 cm) |  |  | 2 | 3 | 1 | 3 | 5 |

INDUSTRIAL APPLICABILITY

The present invention can provide a porous polyvinyl acetal object and a nonwoven polyvinyl acetal fabric each capable of exhibiting significantly high shock absorption.

The invention claimed is:

1. A porous polyvinyl acetal object having a large number of cells, comprising:
a polyvinyl acetal; and
a plasticizer,
the porous object having an open cell ratio of 10% or higher,
the porous object in the form of a sample with a size of 10 cm in length, 10 cm in width, and 4 mm in thickness having a coefficient of rebound (rebounding height/drop height) of 0.1 or lower in measurement of a rebounding height of a ½-inch SUS ball in conformity with JIS B 1501 dropped from a given drop height to the center of the sample placed on an iron plate with a size of 10 cm or more in length, 10 cm or more in width, and 1 cm in thickness.

2. The porous polyvinyl acetal object according to claim 1,
wherein the open cell ratio is 14% or higher.

3. The porous polyvinyl acetal object according to claim 1,
wherein the cells have an average cell size of 100 to 1,000 μm.

4. The porous polyvinyl acetal object according to claim 1,
wherein the cells have an average aspect ratio of 2 or less.

5. The porous polyvinyl acetal object according to claim 1,
wherein the specific gravity thereof is 0.3 or less.

6. The porous polyvinyl acetal object according to claim 1, which is foamed with a heat-decomposable foaming agent.

7. A sound insulation material comprising the porous polyvinyl acetal object according to claim 1.

8. A vibration absorption material comprising the porous polyvinyl acetal object according to claim 1.

9. A shock absorption material comprising the porous polyvinyl acetal object according to claim 1.

10. A nonwoven polyvinyl acetal fabric comprising a fiber containing a polyvinyl acetal and a plasticizer,
the nonwoven fabric having a weight per unit area of 100 to 800 g/m$^2$,
the nonwoven fabric in the form of a sample with a size of 10 cm in length, 10 cm in width, and 4 mm in thickness having a coefficient of rebound (rebounding height/drop height) of 0.1 or lower in measurement of a rebounding height of a ½-inch SUS ball in conformity with JIS B 1501 dropped from a given drop height to the center of the sample placed on an iron plate with a size of 10 cm or more in length, 10 cm or more in width, and 1 cm in thickness.

11. A sound insulation material comprising the nonwoven polyvinyl acetal fabric according to claim 10.

12. A vibration absorption material comprising the nonwoven polyvinyl acetal fabric according to claim 10.

13. A shock absorption material comprising the nonwoven polyvinyl acetal fabric according to claim 10.

* * * * *